UNITED STATES PATENT OFFICE.

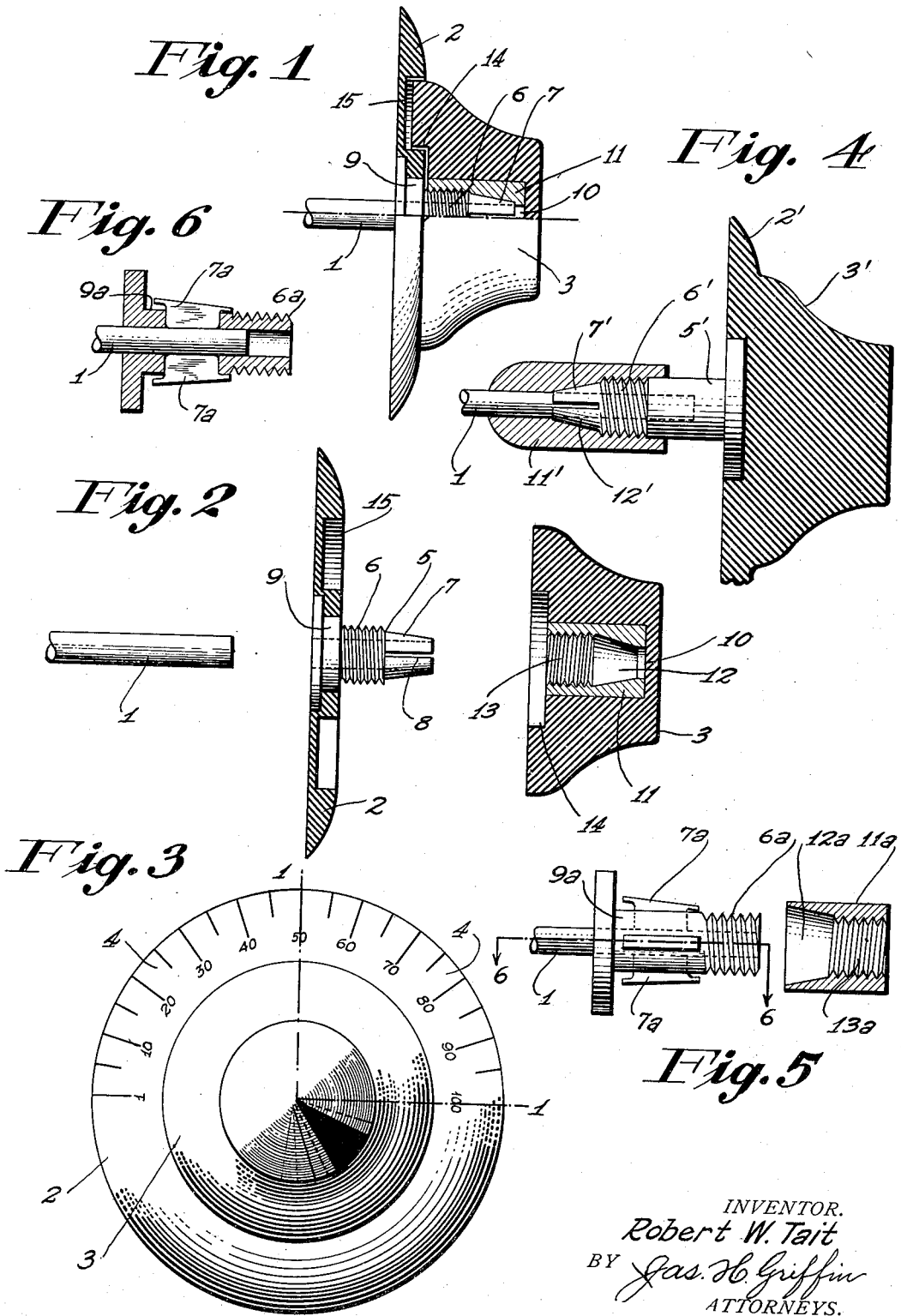

ROBERT W. TAIT, OF NEW YORK, N. Y.

COMBINED KNOB AND DIAL FOR RADIO APPARATUS.

1,420,295. Specification of Letters Patent. Patented June 20, 1922.

Application filed October 12, 1921. Serial No. 507,293.

*To all whom it may concern:*

Be it known that I, ROBERT W. TAIT, a citizen of the United States, residing at New York city, borough of Bronx, county of Bronx, and State of New York, have invented a certain new and useful Combined Knob and Dial for Radio Apparatus, of which the following is a specification.

This invention is a combined knob and dial for radio apparatus and while adapted for radio apparatus generally, is particularly intended for employment in connection with transmitting and receiving sets.

It has become the practice to mount transmitting and receiving sets in a panel and control the adjustment of the instruments of such sets by means of knobs positioned beyond the face of the panel and having associated therewith dials bearing graduations whereby the adjustment of the instruments may be accurately made.

Each of the instruments adapted to be so adjusted is usually provided with a cylindrical shaft or spindle to which the knob and dial are adapted to be secured in fixed position. Various ways have been suggested for securing the knob and dial to the shaft and it is the general practice to make the knob and dial integral and secure the same in position by set screws.

In many instances, these set screws are in inaccessible positions, which makes their manipulation difficult, and in other cases they are so positioned as to render the apparatus unsightly.

The object of the present invention is to provide means for readily and expeditiously securing the knob and dial to an instrument shaft or spindle in such manner that the means for actually securing the knob and dial to the shaft are in concealed position, whereby the device is unusually neat in appearance.

Moreover, the arrangement of the present invention affords a firmer grip of the knob or knob and dial upon an instrument shaft than has been possible with any of the prior constructions and particularly those prior devices wherein the parts were secured to the shafts by set screws or analogous means.

A further object of the invention therefore resides in the firm securing of the knob or the knob and dial upon the shaft or instrument spindle and in accordance with this invention, this means is self centering and aligning, so as to preclude any tendency of the knob or dial to wobble on the spindle.

In the preferred form of the present invention, the dial and knob are made separate from one another, one of these parts being provided with a tapering sleeve, which is threaded to receive a split tapering and threaded tubular post carried by the other part. The shaft or spindle of the instrument is adapted to be received into the bore of the tubular post of the one part and the interiorly threaded tubular sleeve of the other part, thereafter screwed upon the post for the purpose of collapsing the post and forcing the same into binding or clamping relation with the shaft, whereby both parts are assembled with respect to one another and simultaneously rigidly mounted upon the shaft.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 shows an assembly embodying the present invention, partly in side elevation and partly in central section taken on the line 1—1 of Figure 3.

Figure 2 shows a dial and knob in central section and the parts removed from one another and from the shaft.

Figure 3 is a face view of the assembly, illustrated in Figure 1.

Figure 4 shows a modified form in section.

Figure 5 shows a further modified form of the invention with the parts dismantled; and, Figure 6 shows the parts of Figure 5 assembled.

Referring to the drawings and more particularly to Figures 1, 2 and 3, 1 designates a shaft or spindle of any radio instrument, which it is adapted to adjust or control, 2 a dial and 3 a knob. In accordance with the present invention, the dial 2 and knob 3 are made separate from one another, but are adapted to be assembled and simultaneously rigidly mounted on the shaft 1, so that through manipulation of the knob 3, the adjustment of the shaft 1 may be controlled, the extent of which adjustment may be properly determined by means of a scale or series of graduations 4, formed adjacent the outer periphery of the dial 2 after the manner shown in Figure 3.

The dial 2 is circular in contour and may be made of any suitable material, such for example as bakelite or composition rubber, but, in any event, is preferably, although not essentially, of a nonconductive substance.

Extending coaxial of the dial and beyond the forward face thereof is a tubular post 5. This tubular post may be made integral with and of the same material as the dial 2, but, for the purpose of illustration, the dial 2 is shown of an insulating material, while the post 5 is of metal and is molded or otherwise secured coaxial of the dial 2.

A portion of the length of the post immediately adjacent the forward face of the dial 2 is threaded, as shown at 6, while the remaining portion of the length of the post between the threaded portion 6 and its free end is tapered as shown at 7 and this tapering portion is also longitudinally slit as indicated at 8. The post 5 is tubular and is provided with a central bore 9 of such diameter as to receive the end of the shaft or spindle 1.

A pocket 10 is formed in the back of the knob 3 and into this pocket is fixedly seated a tubular sleeve 11, the innermost portion of which is tapered as at 12, preferably at a taper corresponding to the taper of the part 7 of the post, while the remainder or outer portion of the sleeve 11 is threaded as at 13, so that it is adapted to screw on to the threaded portion 6 of the post. The inner face of the knob is further recessed as at 14, so as to impart to the base of the knob a ring-like section and the forward face of the dial is provided with a correspondingly shaped annular recess 15.

In assembling the parts, the dial is first moved into position wherein the end of the shaft or spindle 1 will be received into the bores 9 of the split tubular post and after the dial has been so positioned, the knob 3 is screwed on to the tubular post, so that the frusto conical interior portion 12 of the sleeve 11 is brought into cooperation with the frusto conical end portion 7 of the post, whereby continued screwing of the knob on to the post causes a compression or collapsing of the frusto conical portion 7 with the result that the spindle 1 is tightly gripped. This gripping of the shaft or spindle 1 by the post 5 serves to tightly bind the dial to the shaft simultaneously with the mounting of the knob on the post, so that through the simple operation of assembling the dial and knob, the parts are automatically fixedly mounted on the shaft 1.

Through the provision of the annular recess 15 in the face of the dial and the complementarily shaping of the contiguous face of the knob, the back of the knob is adapted to be received into the recess 15, for the purpose of permitting the knob to be screwed into tight gripping relation upon the post 5 without leaving an unsightly joint or opening between the base of the knob and the face of the dial. If the dial and knob were not complementarily shaped as described, there is a possibility that the knob might become tight on the post before the back of the knob engages the face of the dial, or the knob might engage the face of the dial before it had compressed the post sufficiently to grip the spindle 1. For these reasons, the formation of the dial and knob as described is preferable, where it is desired that the dial and knob shall have the appearance of being integral.

In Figure 4 of the drawings, I have illustrated a modified form of construction embodying the present invention. In this embodiment, the knob 3 and dial 2 are integral with one another and fixedly mounted thereon is a rearwardly extending post 5' threaded for a portion of its length at 6' and having a longitudinally slit frusto conical end 7' into which the end of the instrument shaft 1 is adapted to be inserted. A sleeve 11' having a frusto conical portion 12' is interiorly threaded to screw on to the post 5', in order to collapse the resilient jaws formed by slitting the frusto conical portion of the post and to thereby cause said resilient jaws to tightly grip the spindle 1 and rigidly mount the knob and dial thereon.

The construction shown in Figure 4 is particularly intended to reduce body capacity effect by shifting the instrument to be controlled by the knob and dial back from the panel so as to provide a greater distance between the knob and dial and the instrument as will be clearly understood by those skilled in the art.

In Figures 5 and 6, a further modified form of the invention is shown. In this form of the invention, a post 9$^a$ is adapted to be associated with the dial 2 in the same manner as described with reference to the post 9. The post 9$^a$ is threaded as at 6$^a$ to receive an interiorly threaded sleeve 11$^a$ adapted to be mounted in a knob 3 in the same manner as the sleeve 11. The forward portion of the interior of the sleeve 11$^a$ is threaded as at 13$^a$, while the after portion is tapered or frusto conical as shown at 12$^a$. The post 9$^a$ is provided with radial slots in which are positioned a plurality of tapering jaws 7$^a$, which are adapted to slide easily in a radial direction in the slots of the post. The outer faces of these jaws are inclined, so that when the sleeve 11$^a$ is screwed on to the post 9$^a$, the frusto conical portion 12$^a$ of said sleeve will engage with the jaws 7ª and force them radially inward and into tight gripping relation with the shaft or spindle 1 as will be manifest from Figure 6 of the drawings.

In some instruments a dial is not necessary, in which event the post may be used without the dial and may cooperate with the knob in the manner described to mount the knob by itself on the shaft or spindle.

In the foregoing detailed description of the invention, the post has been described as of different material than the dial 2 and molded therein and the sleeve 11 has also been described as of different material than the knob 3 and firmly seated in a pocket therein. It will be understood, however, that the post may be formed of the same material as the dial 2 and integral therewith and that the sleeve 11 may be formed of the same material as the knob 3 and integral therewith. Moreover, the post 5 has been described as associated with the dial and the sleeve 11 associated with a knob. I am fully aware that this association of these parts may be transposed. That is to say, the sleeve may be associated with the dial and the post with the knob without departing from the spirit of this invention. Other details of construction may be changed such as by the substitution of equivalents without departing from this invention, the scope of which is commensurate with the appended claims.

It will be noted that the knob tapers from its back, towards its front and this tapering or subsantially exterior frusto conical surface of the knob is of marked advantage over the relatively cylindrical knobs heretofore employed. By making the knob smaller at its front, the fingers of the hand gripping the knob do not conceal or interfere with the proper reading of the graduations 4. If the knob were made cylindrical, the fingers, when gripping the knob, would be apt to cover certain figures of the graduations 4, but when the outer end of the knob is reduced after the manner shown, the visability is increased and the graduations may be seen at all times while adjusting the dial.

In the construction of Figures 1-4 inclusive, the post has been described as partly frusto conical and partly cylindrical with a threaded portion on the cylindrical part. It will be manifest, however, that if desired, the frusto conical portion of the complementary female sleeve may be similarly threaded. It follows that the combination of the separate smooth frusto conical portion and the threaded portion might be replaced by a frusto conical threaded portion without departing from this invention.

In the drawings, the surface of the knob is shown as smooth, although, in practice, this surface may be milled or knurled to provide a better gripping.

The specific device described clearly illustrates the principle of the present invention and the best form of its adaptation now known to be, but it is to be understood that the scope of the broad invention is commensurate with the appended claims.

Having thus fully described the invention, what I claim as new and desire to secure by Letters Patent is:

1. Radio apparatus embodying a dial member, a knob member, a threaded tapering radially collapsible tubular post associated with one of said members and a threaded tapering socket associated with the other member, whereby the threaded post is adapted to be screwed into the threaded socket for the purpose of collapsing the post and causing the same to tightly engage an instrument shaft or spindle extending into the interior thereof.

2. Radio apparatus embodying a dial member, a knob member, a threaded tapering post associated with one of said members and longitudinally slit to permit of radial adjustment of said post and a tapering threaded tubular socket associated with the other member, whereby the shaft or spindle of an instrument is adapted to be received into the hollow post, which is thereafter adapted to be screwed into the threaded socket for the purpose of radially contracting the threaded post to cause the same to tightly grip said shaft or spindle.

3. Radio apparatus embodying a dial provided with a coaxial tapering tubular threaded post adapted to be passed over the shaft or spindle of a radio instrument and slit longitudinally to permit of radial adjustment of the post, and a knob provided with a tapering threaded socket adapted to be screwed on to the threaded post for the purpose of forcing the threaded post into gripping relation with the shaft or spindle.

4. Radio apparatus embodying a dial provided with a central aperture, a plurality of resilient jaws adapted to engage an instrument shaft or spindle passed through said aperture, and a knob having threaded engagement with the dial and formed to force the resilient jaws into gripping engagement with the shaft when the dial and knob are screwed together.

5. Radio apparatus embodying a dial member and a knob member, one of which members is provided with a plurality of gripping jaws adapted to engage with an instrument shaft or spindle, and the other of which members is formed to force said jaws into gripping relation with said shaft or spindle when the members are secured together, and means for securing said members together.

6. Radio apparatus embodying a dial, provided in its forward face with an annular recess, a knob having a complementarily shaped ring like section at its back, a forwardly extending tubular tapering threaded post associated with the dial and longitudinally slit, and a threaded tapering socket extending into the knob from the back thereof, whereby the socket of the knob may be screwed on to the threaded post for the purpose of flexing the slotted portion of the post in an inward radial direction to cause the post to grip an instrument shaft or spindle extending thereinto, while the back of the knob is adapted to enter the correspondingly shaped recess of the dial.

7. Radio apparatus embodying a dial provided in its forward face with an annular recess, a knob adapted to be secured to the spindle of a radio apparatus, and the back of which knob is in the form of a complementarily shaped ring, and means for securing the knob and dial together with the ring shaped portion of the knob extending into the annular recess of the dial.

8. Radio apparatus embodying a dial provided in its forward face with an annular recess, a knob, the back of which is in the form of a complementarily shaped ring, and means for securing the knob and dial together and with the ring shaped portion of the knob extending into the annular recess of the dial, said means serving also to simultaneously secure the knob and dial in fixed position on an instrument shaft or spindle.

9. Radio apparatus embodying a tapering threaded and longitudinally slit male member adapted to be passed over an instrument shaft or spindle, and a knob provided with a tapering threaded socket adapted to be screwed on to the tapering male member for the purpose of forcing the male member into gripping relation with the shaft or spindle to tightly mount the knob on the shaft.

10. Radio apparatus embodying an instrument shaft, a knob for regulating said shaft and cooperated threaded and tapering parts for tightly mounting the knob on the shaft, for the purpose of permitting regulation of the shaft through operation of the knob.

11. Radio apparatus embodying an instrument shaft or spindle, a knob for regulating the shaft or spindle, and means for mounting the knob on the spindle comprising resilient clamping jaws adapted to engage the spindle and a member for forcing said jaws into gripping relation with the spindle.

12. Means for securing a knob on the spindle of a radio instrument comprising cooperating male and female members, the former of which is provided with jaws adapted to be forced by the latter into gripping engagement with the spindle, to tightly mount the knob on the spindle so that the spindle may be regulated through manipulation of the knob.

13. A knob for regulating radio apparatus of greater diameter at its back than at its front and sloping from the back to the front with a concave configuration, and means for demountably securing the knob on the spindle of a radio instrument.

14. Radio apparatus embodying a spindle of a radio instrument, a pair of cooperating indicating members adapted to be demountably secured together, and clutch mechanism associated with said members and adapted, when the members are secured together, to grip the spindle for the purpose of mounting both members firmly thereon.

In testimony whereof I have signed the foregoing specification.

ROBERT W. TAIT.